June 1, 1954  F. P. SCHWIEG  2,680,222
TEMPERATURE RESPONSIVE FOLLOW-UP APPARATUS
Filed June 4, 1953
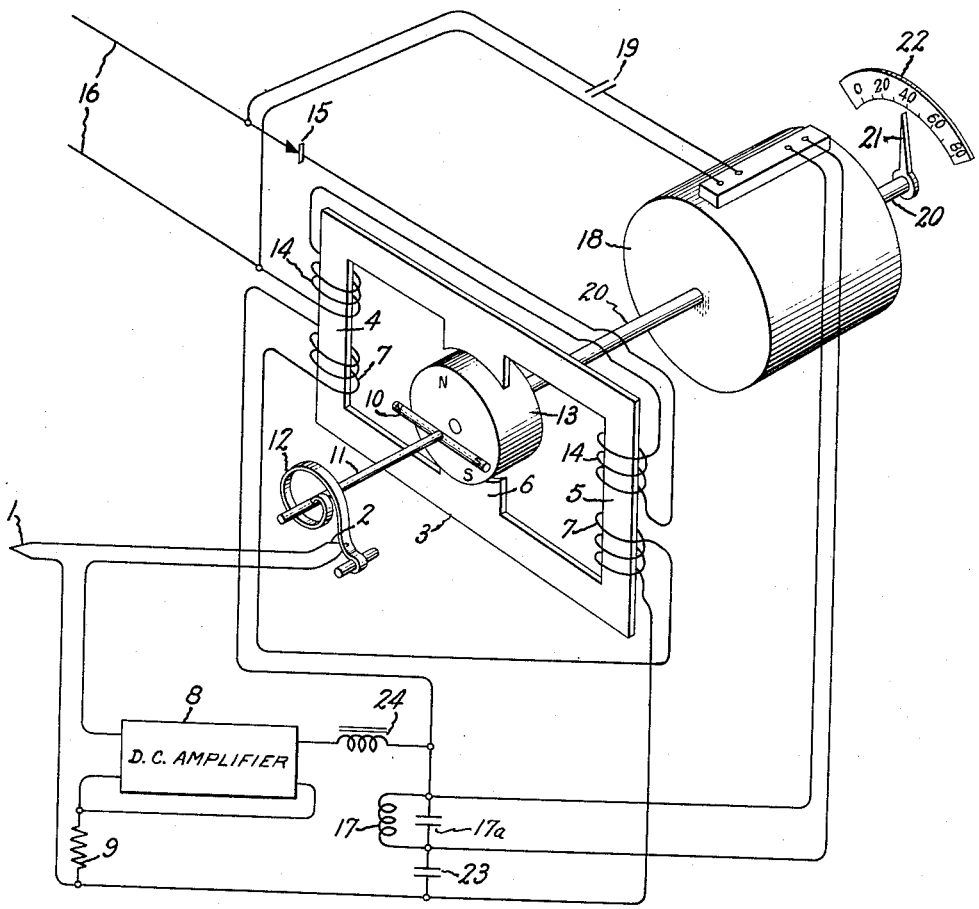
Inventor:
Frederic P. Schwieg,
by Richard E. Hosley
His Attorney.

Patented June 1, 1954

2,680,222

UNITED STATES PATENT OFFICE 2,680,222

TEMPERATURE RESPONSIVE FOLLOW-UP APPARATUS

Frederic P. Schwieg, Nahant, Mass., assignor to General Electric Company, a corporation of New York Application June 4, 1953, Serial No. 359,468

5 Claims. (Cl. 318—28)

My invention relates to temperature responsive apparatus employing a thermocouple for temperature measurement or control, and in particular to such apparatus having improved compensation means for temperature variations of the reference junction of the thermocouple.

Thermocouple systems employ two thermocouple junctions, one of which, often called the "hot" junction, is at the temperature to be measured or controlled, and the other of which, often called the "cold" junction, is at some reference temperature. As is well known, the thermocouple provides an electromotive force which is related in value to the temperature difference between the two junctions. In laboratory work, the "cold" junction may be maintained at a constant, well-regulated temperature; but in industrial applications, this is often not convenient or practicable, so that variations in the "cold" junction temperature present a substantial problem unless some means of compensating for such variations is employed.

A principal object of my invention is to provide a temperature measuring or control system having improved "cold" junction temperature compensating means.

Briefly stated, in accordance with one aspect of my invention, an amplifier provides an electric current through a winding of a saturable magnetic element to produce a component of magnetic flux related in value to the electromotive force provided by the thermocouple. A second component of magnetic flux is provided by a rotatable permanent magnet, the angular position of which is automatically adjusted in accordance with "cold" junction temperature values by a bimetallic element in good thermal contact with the "cold" junction, so that the algebraic sum of these two components of magnetic flux is a function substantially only of the "hot" junction temperature. Measurement or control means are provided which respond to this sum of flux components as hereinafter explained.

My invention will be better understood from the following description taken in connection with the accompanying drawing, and its scope will be pointed out in the appended claims.

In the drawing, the single figure is a diagrammatic representation of temperature measuring apparatus embodying principles of my invention.

Referring now to the drawing, a thermocouple comprises a "hot" junction 1 and a "cold" junction 2. In use, the junction 1 is maintained at the temperature to be measured for example, by connection in good thermal contact with an element at the measured temperature. The junction 2 normally remains substantially at the ambient temperature. As is well known, the thermocouple provides an electromotive force related in value to the temperature difference between junctions 1 and 2.

A saturable magnetic element 3 has outer legs 4 and 5 and a center leg 6. There is a gap in leg 6, as shown, for purposes hereinafter explained. A first set of windings 7 is provided about the two outer legs 4 and 5.

Any suitable D. C. amplifier means 8 is connected as shown to provide through windings 7 a unidirectional electric current related in value to the electromotive force provided by the thermocouple. Preferably, this electric current also passes through a feedback resistor 9 thereby producing a voltage drop which substantially balances the electromotive force of the thermocouple. Thus, the current through windings 7 is substantially proportional to the thermocouple electromotive force.

The unidirectional current through windings 7 produces a first unidirectional magnetomotive force, which provides in saturable element 3 a first component of magnetic flux which passes in the same direction, either upward or downward, selectively, through the two outer legs 4 and 5.

A first rotatable permanent magnet 10 is connected through a shaft 11 to a spiral bimetallic element 12, as shown. Thermocouple junction 2 is attached to bimetallic element 12 in good thermal contact therewith, so that junction 2 is maintained at the temperature of element 12. Element 12 automatically adjusts the angular position of magnet 10 in accordance with the temperature of the bimetallic element, and hence in accordance with the temperature of junction 2. Permanent magnet 10 produces a magnetomotive force which provides in saturable element 3 a second component of unidirectional magnetic flux which passes in the same direction, either upward or downward, selectively, through outer legs 4 and 5. The value of this second component of flux is determined by the angular position of magnet 10, and hence by the temperature of junction 2. By choosing suitable values for the strength of magnet 10, its distance from center leg 6, and the characteristics of bimetallic element 12, in relation to the thermocouple characteristics, this second component of magnetic flux provides substantial compensation for temperature variations of junction 2, so that the algebraic sum of the first and second components of unidirectional magnetic flux is related substantially only to the temperature of thermocouple junction 1.

A second rotatable permanent magnet 13 is positioned within the gap of center leg 6 as shown. Magnet 13 produces a magnetomotive force which provides in saturable element 3 a third component of unidirectional magnetic flux which passes in the same direction, either upward or downward, selectively, through outer legs 4 and 5. The value of this third component of flux depends upon the angular position of magnet 13. As is hereinafter more fully explained, the angular position of magnet 13 is automatically adjusted to keep the algebraic sum of the first, second and third components of unidirectional flux substantially zero. Thus, the angular position of magnet 13 is related to the temperature of thermocouple junction 1.

A second set of windings 14 are provided about the two outer legs 4 and 5, as shown. Windings 14 are connected, in series with a rectifier 15, to electrical connections 16. Alternating current is supplied to connections 16 by any suitable means. This current may, for example, have a frequency of 400 cycles per second. This produces a pulsating electric current through windings 14, which provides in saturable element 3 a pulsating component of magnetic flux which passes in opposite directions through the two outer legs 4 and 5 for example, downward through leg 4 and upward through leg 5. This pulsating component of flux induces alternating voltages in the two halves of winding 7.

So long as the algebraic sum of the three unidirectional components of flux is zero, the respective pulsating components of flux in legs 4 and 5 are equal, and the respective voltages induced in the two halves of windings 7 are equal and opposed, so that the net voltage induced in winding 7 is zero. However, if the algebraic sum of the three components of unidirectional flux is not zero, legs 4 and 5 are unequally saturated by the magnetic fluxes, and in consequence the respective pulsating fluxes through the two legs are unequal. This induces in windings 7 a net alternating voltage having an amplitude and phase related to the value of the algebraic sum of the three components of unidirectional magnetic flux.

This induced voltage, which is in the nature of an "error signal" indicating that the position of magnet 13 should be readjusted to bring the components of unidirectional flux back into balance, appears substantially across a resonant circuit comprising inductor 17 and capacitor 17a, and is applied to the control winding of a two-phase servomotor 18. The field winding of servomotor 18 is connected through a phase-shifting capacitor 19 to electrical connections 16, as shown. As is well known, such an arrangement causes servomotor 18 to rotate a shaft 20 in a direction which depends upon the phase of the induced voltage in winding 7, which in turn depends upon the direction of unbalance of the three components of unidirectional magnetic flux. Magnet 13 is attached to one end of shaft 20. Thus, motor 18 automatically adjusts the angular position of magnet 13 and thus automatically keeps the three components of unidirectional magnetic flux substantially balanced.

Attached to the other end of shaft 20, there may be provided an indicating pointer 21 which cooperates with a fixed scale 22 calibrated in suitable temperature units. Since the angular position of magnet 13 is automatically adjusted by the mechanism described to values related to the temperature of junction 1, and since pointer 21 rotates with magnet 13, the position of pointer 21 relative to the calibrated scale 22 indicates the measured temperature.

In addition to, or in place of, the pointer 21, I may provide recording apparatus, or control apparatus for controlling any desired variable in correspondence with the measured temperature.

The capacitor 23 is connected in series with the resonant circuit comprising inductor 17, as shown, so that the unidirectional current from amplifier 8 must flow through windings 7, and cannot be shorted through the inductor 17. The choke coil 24 is provided to keep the alternating voltage induced in winding 7 out of the amplifier circuits.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. Temperature responsive apparatus comprising a thermocouple having two junctions connected in series to provide an electromotive force related in value to the temperature difference between said two junctions, means to provide a first magnetomotive force related in value to said electromotive force, and means to provide a second magnetomotive force so related in value to the temperature of one of said junctions that the algebraic sum of said first and second magnetomotive forces is related in value substantially only to the temperature of the other of said junctions.

2. Temperature responsive apparatus comprising a thermocouple having two junctions connected in series to provide an electromotive force related in value to the temperature difference between said two junctions, means to provide a first magnetomotive force related in value to said electromotive force, permanent magnet means to provide a second magnetomotive force related in value to the position of said permanent magnet means, and means including a bimetallic element for automatically adjusting the position of said permanent magnet means in accordance with the temperature of said bimetallic element, one of said junctions being attached to said bimetallic element and thereby being maintained at the same temperature as said element.

3. Temperature responsive apparatus comprising a thermocouple having two junctions connected in series to provide an electromotive force related in value to the temperature difference between said two junctions, a saturable magnetic element having at least one winding thereon, means to provide through said winding an electric current related in value to said electromotive force, thereby producing in said saturable element a first magnetomotive force, a rotatable permanent magnet producing in said saturable element a second magnetomotive force related in value to the angular position of said permanent magnet, and means including a spiral bimetallic element for automatically adjusting the angular position of said permanent magnet in accordance with the temperature of said bimetallic element, one of said junctions being in good thermal contact with said bimetallic element.

4. Temperature responsive apparatus comprising a thermocouple having two junctions connected in series to provide an electromotive force related in value to the temperature difference between said two junctions, a saturable magnetic element having at least one winding thereon, an amplifier connected to provide through said winding an electric current related in value to said electromotive force, thereby producing in said saturable element a first magnetomotive force, a rotatable permanent magnet positioned adjacent the said saturable element to produce therein a second magnetomotive force related in value to the angular position of said permanent magnet, means including a spiral bimetallic element for automatically adjusting the angular position of said permanent magnet in accordance with the temperature of said bimetallic element, one of said junctions being connected in good thermal contact with said bimetallic element, and a means responsive to the algebraic sum of said first and second magnetomotive forces.

5. Temperature responsive apparatus comprising a thermocouple having two junctions connected in series to provide an electromotive force related in value to the temperature difference between said two junctions, a saturable magnetic element having two outer legs and a center leg, said center leg having a gap therein, a first set of windings about said two outer legs, an amplifier connected to provide through said first set of windings a unidirectional electric current related in value to said electromotive force, thereby producing in said saturable element a first magnetomotive force which provides a first component of unidirectional magnetic flux passing in the same direction through said two outer legs, a first rotatable permanent magnet positioned adjacent to said center leg to produce in said saturable element a second component of unidirectional magnetic flux passing in the same direction through said two outer legs, said second component of flux being related in value to the angular position of said first permanent magnet, means including a spiral bimetallic element for automatically adjusting the angular position of said first permanent magnet in accordance with the temperature of said bimetallic element, one of said junctions being attached to said bimetallic element in good thermal contact therewith, a second rotatable permanent magnet positioned within the gap of said center leg to produce in said saturable element a third component of unidirectional magnetic flux passing in the same direction through said two outer legs, said third component of flux being related in value to the angular position of said second permanent magnet, a second set of windings about said two outer legs, means for providing a pulsating electric current through said second set of windings to produce a pulsating component of magnetic flux passing in opposite directions through said two outer legs, thereby inducing in said first set of windings an alternating voltage related in value to the algebraic sum of said first, second and third components of magnetic flux, and servomotor means responsive to said alternating voltage for automatically adjusting the angular position of said second permanent magnet to reduce such algebraic sum of fluxes substantially to zero.

References Cited in the file of this patent

UNITED STATES PATENTS

| Number | Name | Date |
|---|---|---|
| 2,600,342 | Tucker | June 10, 1952 |
| 2,645,748 | Hansen, Jr. | July 14, 1953 |